US 6,195,827 B1

(12) United States Patent
Dumitriu

(10) Patent No.: US 6,195,827 B1
(45) Date of Patent: Mar. 6, 2001

(54) ELECTROSTATIC AIR BLOWER

(75) Inventor: Ion Dumitriu, Nynäshamn (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/497,159

(22) Filed: Feb. 3, 2000

(30) Foreign Application Priority Data

Feb. 4, 1999 (SE) .................................................. 9900367

(51) Int. Cl.$^7$ ...................................................... B08B 6/00
(52) U.S. Cl. .............................. 15/1.51; 15/306.1; 15/345; 15/404
(58) Field of Search .................................. 15/1.5, 306.1, 15/303, 309.1, 345, 404

(56) References Cited

U.S. PATENT DOCUMENTS

| | | | | |
|---|---|---|---|---|
| 3,128,492 | * | 4/1964 | Hanscom | 15/1.51 X |
| 4,213,167 | * | 7/1980 | Cumming et al. | 15/1.51 X |
| 4,241,377 | * | 12/1980 | Cumming | 15/1.51 X |
| 4,727,614 | * | 3/1988 | Swistun | 15/1.51 |
| 4,751,759 | * | 6/1988 | Zoell | 15/345 X |
| 5,056,185 | * | 10/1991 | Schotter | 15/308 X |

FOREIGN PATENT DOCUMENTS

3932319 A1 4/1991 (DE).
0 524 415 A2 1/1993 (EP).

OTHER PUBLICATIONS

Japanese Patent Abstract of 59–13641 dated Jan. 24, 1984.

* cited by examiner

Primary Examiner—Chris K. Moore
(74) Attorney, Agent, or Firm—Burns, Doane, Swecker & Mathis, L.L.P.

(57) ABSTRACT

The present invention relates to an electrostatic air blower which is preferably intended for use in cleaning optofibers without risking the contamination of said fibers with, e.g., metal particles that may have been loosened from electrodes used in a cleaning process. The ends of optofibers can be cleaned simply and reliably prior to welding said ends together, with the aid of said electrostatic air blower. The electrostatic air blower includes two ceramic plasma caoons (11, 12) which face towards one another at a given distance apart. Each plasma cannon includes a ceramic tube which houses an electrode. Repeated discharges between the electrodes in the tubes causes pressure waves to be generated in the air present between the tube orifices. An optofiber (14) or the end of an optofiber placed in the proximity of the tube orifices close to the symmtry axis of said tube will be subjected to these pressure waves and any contaminants present, such an dust or dirt particles on the surface of the optofiber, will be blown away.

8 Claims, 2 Drawing Sheets

ELECTROSTATIC AIR BLOWER

This application claims priority under 35 U.S.C. 119 and/or 365 to 9900367-5 filed in Sweden on Feb. 4, 1999; the entire content of which is hereby incorporated by reference.

FIELD OF THE INVENTION

The present invention relates to an electrostatic air blower intended preferably for blowing clean optofibers without the risk of contaminating the optofibers with, e.g., metal particles that might possibly be loosened from electrodes used in a cleaning process.

DESCRIPTION OF THE BACKGROUND ART

It is, known to clean the ends of optofibers manually prior to joining or splicing said ends together, either with the aid of mechanical means or with the aid of a cleaning agent. It is also known to clean the ends of optofibers prior to welding together said ends with the aid of electrodes. Published patent specification DE 3 932 319 A1 teaches a method and a device with which the ends of optofibers are cleaned by generating an electric field between the tip of an electrode and a respective end of said optofiber, therewith enabling contaminants on said end to be released and drawn away by suction The Abstract of Japanese patent application JP 59 013 641 A discloses a method of removing particles from an optofiber electrostatically with the aid of an ioniaed gas flow, in an optof iber manufacturing process.

SUMMARY OF THE INVENTION

It is necessary to clean the ends of optofibers before welding said fibers together. According to the invention, contaminants present on th ends of optofibers can be easily and effectively removed therefrom with the aid of a so-called electrostatic air blower and then removed by suction, such as to clean the ends of said optofibers effectively prior to welding the ends together. The electrostatic air blower comprises two ceramic plasma cannons which are spaced a given distance apart and directed towards one another. Each plasma cannon includes a ceramic tube which surrounds an electrode. Repeated discharges between the electrodes in respective tubes results in the build-up of pressure waves in the air between the tube orifices, wherewith an optofiber or one and of an optofiber placed in the proxity of the es of said tubes, close to their symmetry ages, will be subjected to the effect of these pressure waves and any contaminants present on the optofibre, such as dust and particles of dirt, blown away thereby. Thewe freed contaminants can then be sucked away with the aid of a suction device provided to this end.

Plasma cannons may also be used to expand the core of an optofiber and to heat treat the optofiber itself. The expansion/diffusion of the core of the optofiber is achieved by heating a given length of the optofiber to a given temperature over a given period of time. When the fiber core has a higher doping concentration than the cladding and is heated to a given temperature immediately beneath its melting point, the dopant concentration in the core will decrease gradually due to diffusion of the dopanta in the glass mass, The fiber core of an optofiber can be caused to eaaand after a given period of time, by moving said optofiber backwards and forwards at a constant speed between two plasma cannons that generate continuously a specific (non-pulsating) plasma heating effect. Expansion of the core is proportional to the temperature and to the time in which the optofiber is exposed to the heat. The fiber core can also be expanded over a given length of the fiber, by moving the optofiber between the orifices or mouths of two plasma cannons. The method can also be applied to match the core diameters of two optofibers that have mutually different core diameters, prior to welding said optofibers together. Heat treatment is effected by heating the optofiber to a given temperature without initiating core-diffusion of the fiber, simply by moving the optofiber between two active plasma cannons at a high speed. The method can also be applied to stabilize short fiber gratings after writing the gratings into an optofiber.

The invention will now be described in more detail with reference to a preferred odiment thereof and also with reference to the accompanying drawings.

DETAILED DESCRIPTION OF PREFERRED EMBODIMENTS

Figure 1:
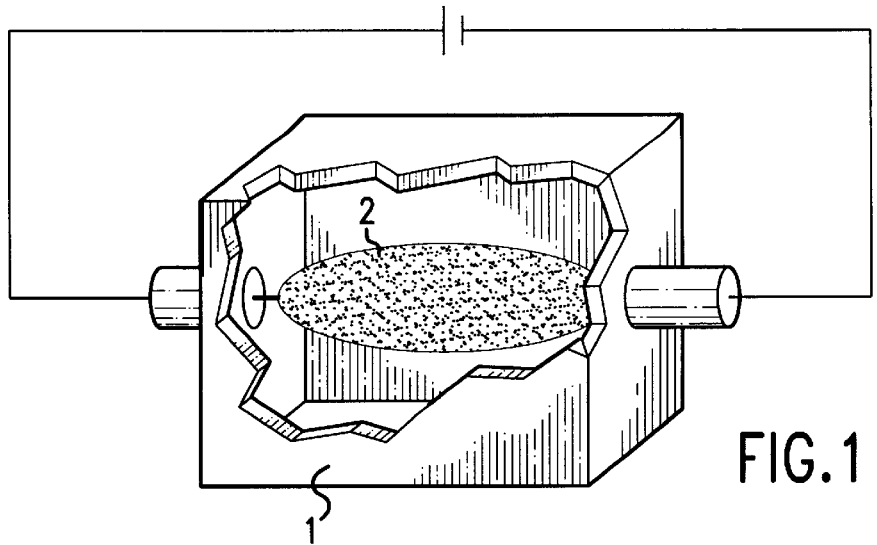
FIG. 1 is a simplified illustration of an electric discharge between two electrodes.
Figure 2:
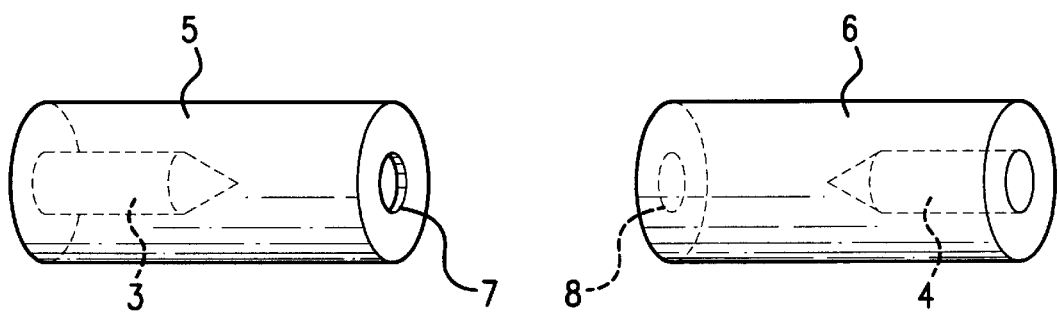
FIG.2 is a simplified illustration of an inventive electrostatic air blower.

When a small, closed chamer 1, such as the chamber shown in FIG. 1, filled with air at a standard pressure of 1000 mb is heated extremely quickly, a high pressure will be generated briefly in the chamber as a result of the rapidly expanding air volume. The air can be heated quickly in various ways, such as with a pulsating laser beam or by means of an electric discharge 2 between two electrodes. For economical reasons and for the make of simplicity, the inventive method uses a further development of this latter air beating process, i.e. a process which utilizes an electric discharge. An inventive electrostatic air blower comprises two plasma cannons, including two discharge electrodes 3, 4 which are comprised of tungsten mixed with torium in a concentration of less 2% so as to reduce the exciting work, and two ceramic tubes 5, 6 which include discharge orifices 7, 8 and which in the illustrated case partially surround the electrodes, as shown in FIG. 2.

An electric discharge is effected between the tungsten electrodes, by applying a combined DC/AC current (About 25 KV/0.1 ms) of short duration, which ionises the air prevent between the electrodes and the ceramic tubes and generates a plasma between the two electrodes. Because the air present around the electrodes,will therewith be heated very rapidly to some thousand degrees, centigrade, the air is dissociated into ions and electrons which form an "ionization waves" that propagates towards the tube orifices. This ionization wave generates a pressure wave in the air along the symmetry axis of the electrode and po endicular to the electric field lines. Velocities of 10E5–10E6 m/s have been measured in the thus formed pressure wave. The velocity of the pressure wave is dependent on the magnitude of the electric field, the distance between the electrodes and the ambient pressure, e.g. the air pressure. Since the electrode spacing and the ambient pressure will be essentially "constant", the velocity of the pressure wave can be controlled by controlling the value of the electrostatic field, i.e. the value of the current that passes between the two electrodes, and a controlled pulsating supply voltage can be applied to the two electrodes of the plasma cannons.

Figure 5:
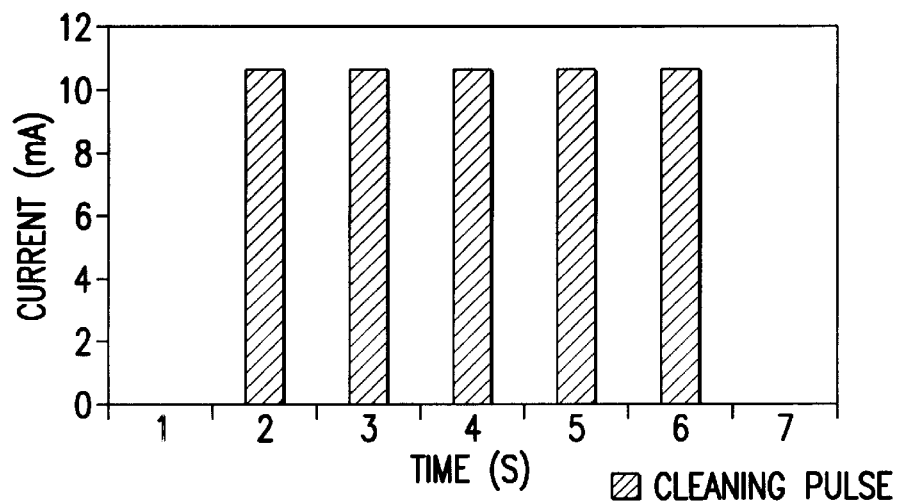
FIG. 5 is a diagrwmtic illustration of the plasma cannon supply voltage.

The resonance of the system can be found, by pulsating the DC/AC current and applying said current between the electrodes with a given period and frequency, see FIG. 5, i.e. the electrostatic air blower can be given maximum efficiency. The pressure vector has a maximum value along the electrode axis and decreases rapidly with the distance from said axis.

One drawback with creating plasma by electric discharges between electrodes is that the plasma formed is unavoidably contaminated with electrode material. Such contamination can be avoided; however, by using electrode-less discharges although this is normally achieved at the cost of lower efficiency.

Figure 3:
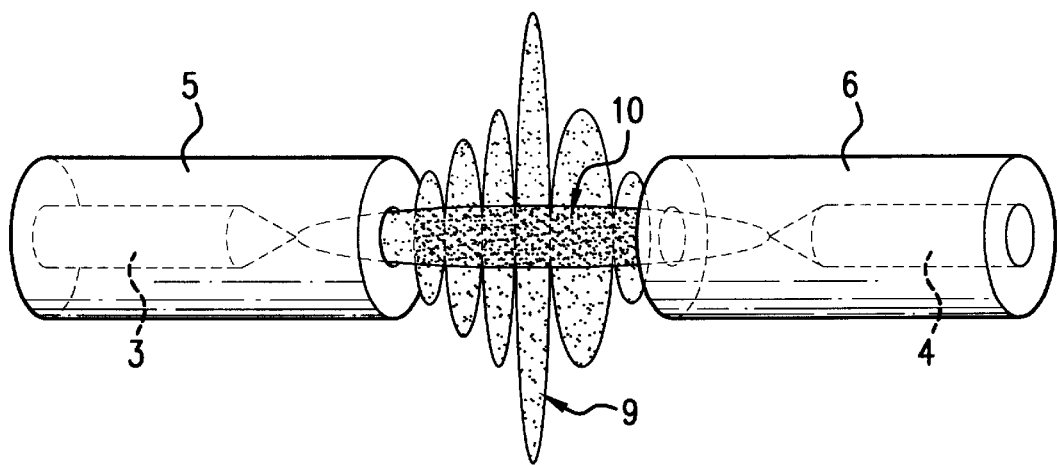
FIG. 3 illustrates isotherml distribution with and without ceramic tubes, and shows how the distribution is distorted by ceramic tubes.

When the current is allowed to flow between the electrodes over a longer period of time, i.e. when pulsating discharges are not applied, the pressure wave that has been formed at the commencement of the discharge will be equalized in the surroundings and a steady state air pressure, a so-called self-sustained discharge, will be obtained between the electrodes and between the orifices of the ceramic tubes respectively. As a result of the ceramic tubes 5, 6, the isothermal distribution of the electric wave 9 (the plasma) will be distorted (as shown in FIG. 3) in comparison with normal isotherml distribution obtained in the absence of ceramic tubes 10. The condition for air breakdown, i.e. the establishment of a self-sustained discharge. is a function of the quotient E/p, i.e. of V/pd, where d is the electrode spacing and V is the electric potential difference between the electrodes, and p is the air pressure, It will also be observed that the potential difference necessary for this breakdown will. preferably be a function of pd, and said function will preferably have a minimum at some value of pd.

By starting repeated discharges at regular intervals, these can be produced between the two plasma cannons a pulsating pressure wave that has sufficient energy to blow away small particle. that are present between the cannons.

The pressure wave generated between the plasnm cannons can be used, for instance, to clean optofibers (single or ribbon fibers) without the risk of contaminating the fibers with metal particles that may have been loosened from the electrodes. Particles that loosen from the electrodes are captured in the tube orifices or their path is well collimated/concentrated around the axes of the electrodes.

The inventive electrostatic air blower is comprised of two ceramic plasma cannons. The orifices of said cannons are directed towards each other and preferably have a diameter of 2 mm and a mutual spacing of 2.5 mm. When using short plasma pulses between the two cannons, there is formed a pressure wave which is directed at right angles to the axis of respective cannons. This pressure wave can be used to blow away from an optofiber present in the device any small particles that have been freed from the coating material. The particles that can be blown away are located essentially in the vicinity of the symmetry axes of the cannons and consist, e.g., of dirt particles on the optofiber itself. The optofiber may be moved at a constant speed between the cannons in a fiber cleaning process; see FIG. 4.

Figure 6:
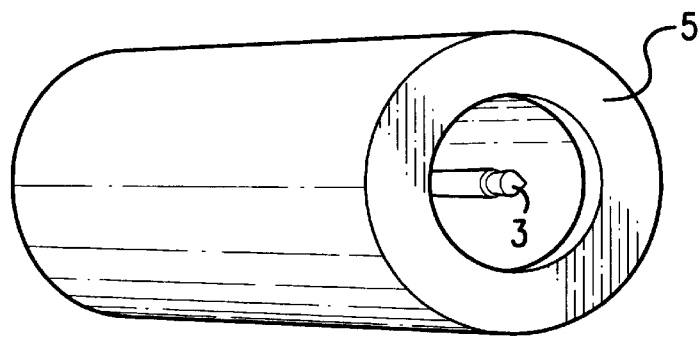
FIG. 6 is a simplified illustration of a plasma canon construction.

The plasma cannons 11, 12 will preferably comprise two ceramic tubes and tungestenTh electrodes mounted within said tubes. The distance between the orifice of the plasma cannons is about 2.5 mm, while the distance between the tips of the electrodes is about 3.5 mm. A high voltage unit is connected to the. electrodes and used to supply said electrodes with both a DC and AC voltage. The current flowing through the plasma is measured and fed back to a control circuit which functions to accurately control the power in the plasma. A monitoring and control unit, such as a microcontrol device, can drive and control the two plasma cannons such as to apply a controlled and pulsating supply of voltage to the electrodes of the two plasma cannons. The construction of a plasma cannon is shown in more detail in FIG. 6.

The advantage afforded by using plasma cannons instead of metal electrodes is that metal particles torn from the electrodes upon commencement of the plasma are captured in the tubes of said cannons and never reach the optofiber. This advantage is particularly beneficial when high strength fibers are required. Another benefit with the use of plasma cannons is that a well-directed pressure wave can be obtained at the start of the discharge an distinct from open electrodes which generate a uniform pressure wave that is distributed in all directions, ire. a lower pressure per surface area and lower efficiency.

Figure 4:
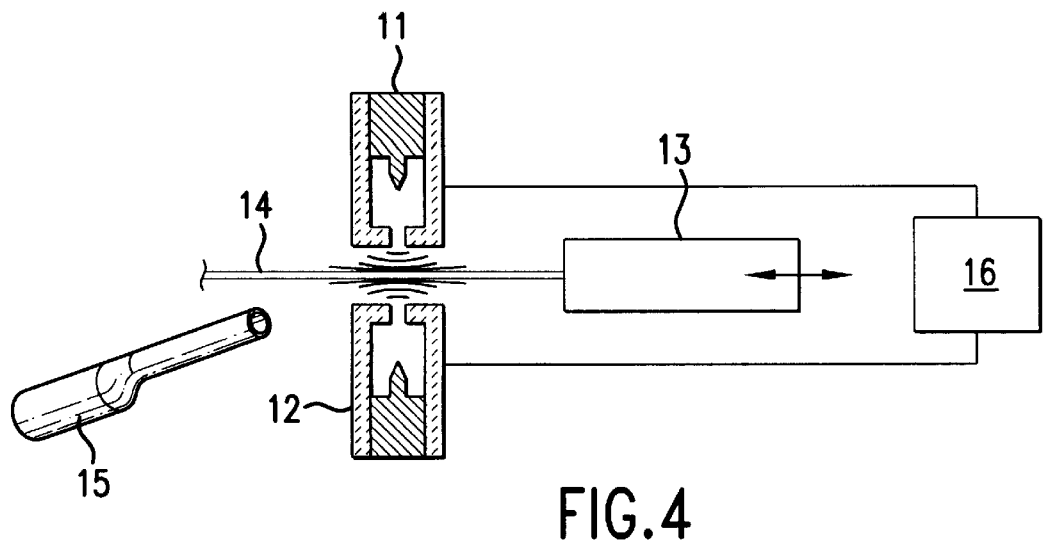
FIG. 4 illustrates a fiber cleazing unit that includes plasma cannons in accordce with the invention.

The advantages afforded by the two plasma cannons can be utilized in the construction of a fiber cleaning device of the kind illustrated in FIG. 4 for instance, The device may comprise a movable fiber holder 13, or the optofiber can be clamped firmly between two support points without tensioning the fiber such as to avoid being of the fiber during the fiber cleaning process. The fiber holder may be caused to =ove the optofiber 14 between the two plasma cannons 11, 12 at a specific, uniform and controllable speed. The fiber is moved perpendicularly to the symetry axis of respective cannons and the fiber axis is offset in relation to the symmetry axes of said cannons by about 0.5 mm. This offset is used in order to utilize the effect of the pressure wave to a maximum and to avoid any metal particles that may have been torn from the electrodes and not captured in the ceramic tube from striking/damaging the optofiber. Because a D.C. voltage field is applied continuously on the two plasma cannons, it can be expected that all small particles which are blown away from the fibers will be attracted to the ceramic tubes and vaporized by the heat emitted by the hot cannons, as the particles come into contact therewith. A suction device 15 may be arranged in the proximity of the plasma cannons for collecting contaminants that have been blown away from the optofiber and that were not attracted to the hot plasma cannons. The fiber cleaning device may be monitored or controlled automatically by a monitoring and control unit 16 which functions to control and monitor the means required to effect cleaning of the fiber, The supply voltage applied to the electrodes will preferably be a pulsating voltage; see FIG. 5. The plasma cannon supply voltage may be generated with the aid of a microcontrol device, which will preferably control the following parameters:

a. Pulse power (current x voltage). However, because the glow potential is almost always constant for a constant distance between cannons (electrodes), it suffices to control solely the current in order to control the power in the plasma cannon.

b. The pulse width, i.e. the blowing effect of the device. The highest efficiency is obtained when the pulses have a width of about 0.1–0.2 s, which is equally as long as the ionisation time of air at atmospheric pressure.

c. The interval between two consecutive pulges may vary between 0.5 till 1 s, according to the level of contamination of a fiber.

The aforesaid parameters were optimized on a prototype, which was used to evaluate the principle per se. All tests carried out showed that the electric air blower was highly effective in respect of cleaning optofibers and that the fibers were influenced to a lesser extnt by elactrode contmnants than was usual when using conventional open or uncovered electrodes.

It will be understood that the invention is not restricted to the aforedescribed and illustrated embodiment thereof, and that modifications can be made within the scope of the accompanying claims.

What is claimed is:

1. An electrostatic air blower preferably intended for use in cleaning at least one optofiber, characterized in that the air blower includes two ceramic plasma cannons (11, 12) which face towards each other at a given distance apart, wherein each plasma cannon comrises a ceramic tube (5, 6) which houses an electrode (3, 4), wherein repeated discharger of the electrodes generates in the surrounding air a pressure wave which acts on the optofiber (14) placed in the proximity of the orifice of respective plasma cannon, said pressure wave being effective in blowing away contaminants, such as small particles present on the optofiber.

2. An electrostatic air blower according to claim 1, characterized by means for applying a controlled pulsating supply voltage to the electrodes (3, 4) of the plasma cannons.

3. An electrostatic air blower according to claim 1, characterized in that the symmetry axis of the optofiber (14) has a specific offset to the symetry axis of the plasma cannons (11, 12) when cleaning the fiber.

4. An electrostatic air blower according to claim 3, characterized by means for moving the optofiber (14) during a fiber cleaning process.

5. An electrostatic air blower according to claim 4, characterized by means for moving the optofiber (14) at a controllable speed.

6. An electrostatic air blower according to claim 4 characterized in that the optofiber (14) is clamped in a fiber holder (13) or is mounted between two support points without being tensioned, so as to avoid bending of the optofiber in the cleaning process.

7. An electrostatic air blower according to claim 1, characterized in that the optofiber (14) is freed from coating material prior to applying said pressure wave.

8. An electrostatic air blower according to claim 1, characterized by auctionf men (15) for collecting contaminants that are blown away by said air blower.

\* \* \* \* \*